(12) United States Patent
Posternak et al.

(10) Patent No.: US 9,946,272 B2
(45) Date of Patent: Apr. 17, 2018

(54) THERMOSTATIC VALVE HAVING A SLEEVE

(71) Applicant: VERNET, Ollainville (FR)

(72) Inventors: Aude Posternak, Massy (FR); Thierry Maraux, Les Clayes sous Bois (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 15/329,998

(22) PCT Filed: Jul. 28, 2015

(86) PCT No.: PCT/EP2015/067226
§ 371 (c)(1),
(2) Date: Jan. 27, 2017

(87) PCT Pub. No.: WO2016/016219
PCT Pub. Date: Feb. 4, 2016

(65) Prior Publication Data
US 2017/0248977 A1 Aug. 31, 2017

(30) Foreign Application Priority Data

Jul. 29, 2014 (FR) ...................................... 14 57335

(51) Int. Cl.
*G05D 23/02* (2006.01)
*F01P 7/16* (2006.01)
(52) U.S. Cl.
CPC .............. *G05D 23/022* (2013.01); *F01P 7/16* (2013.01)
(58) Field of Classification Search
CPC .............................. G05D 23/02; G05D 23/022

USPC ......... 236/93 A, 93 R, 99 J, 99 K, 99 R, 100
See application file for complete search history.

(56) References Cited

FOREIGN PATENT DOCUMENTS

| FR | 2 993 036 A1 | 1/2014 |
|----|--------------|--------|
| WO | WO 2013/124410 A1 | 8/2013 |

OTHER PUBLICATIONS

International Search Report, dated Sep. 22, 2015, in International Application No. PCT/EP2015/067226.
French Search Report, dated Apr. 28, 2015, in French Application No. FR 1457335.

*Primary Examiner* — Jonathan Bradford
(74) *Attorney, Agent, or Firm* — Knobbe, Martens, Olson & Bear, LLP (57) ABSTRACT

Thermostatic valve including a housing; a sleeve for regulating the circulation of a fluid in the housing, movable along its axis; a thermostatic element, the moving part of which is movable along the axis relative to its stationary part resulting from an expansion of the thermodilatable material of this element so as to move the sleeve; a compression spring for returning the stationary and moving parts toward one another; and a bracket supporting the spring, which supports a decompression thrust produced by the spring and is provided with both fasteners for fastening to a bearing portion of the housing transverse to the axis, these fasteners cooperating in a form-fitting manner with the bearing portion so as to be attached with the bearing portion along the axis resulting from a decompression thrust produced by the spring, and locking for locking the bracket in position while axially abutting against the bearing portion.

13 Claims, 3 Drawing Sheets

THERMOSTATIC VALVE HAVING A SLEEVE

PRIORITY AND CROSS REFERENCE TO RELATED APPLICATIONS

This application is the U.S. National Phase Application under 35 U.S.C. § 371 of International Application No. PCT/EP2015/067226, filed Jul. 28, 2015, designating the U.S. and published as WO 2016/016219 A1 on Feb. 4, 2016, which claims the benefit of French Patent Application No. FR 1457335, filed Jul. 29, 2014. Any and all applications for which a foreign or a domestic priority is claimed is/are identified in the Application Data Sheet filed herewith and is/are hereby incorporated by reference in their entirety under 37 C.F.R. § 1.57.

BACKGROUND

The present invention relates to a thermostatic valve, in particular for a fluid circulation circuit, in particular a coolant for a heat engine.

Valves provided with a regulating sleeve for the circulation of a fluid, the movement of which is controlled by a thermostatic element typically equip cooling circuits associated with high-displacement heat engines, in particular those used in trucks or certain motor vehicles, which require higher coolant flow rates for operation than those encountered for heat engines with lower displacement, for which the thermostatic valves used often have gates.

In fact, using a sleeve generally makes it possible to have a so-called balanced shutter i.e., a shutter for which the difference in the pressures prevailing on either side of the wall of the sleeve is substantially zero in the direction in which the sleeve is moved by the thermostatic element, that direction in practice corresponding to the axial direction of the sleeve. Conversely, in a thermostatic valve with a gate, the latter generally extends in a plane perpendicular to the direction in which the gate is moved by the thermostatic element, such that the difference in the pressures prevailing on either side of the gate in that direction reaches high values, in particular when the circulation of fluid is interrupted by the gate. The energy necessary to unstick such a gate from its seat is then often significant, even more so when the flow rate of fluid to be regulated is significant and comes in the closing direction of the gate.

SUMMARY

The disclosure relates to a thermostatic valve, including:
a housing in which a fluid circulates,
a sleeve for regulating the circulation of the fluid in the housing, this sleeve being substantially centered on an axis along which the sleeve is movable relative to the housing to cut/allow a flow of fluid,
a thermostatic element, containing a heat-expandable material and comprising a stationary part, which is fixedly connected to the housing, and a moving part, which is movable along the axis relative to the stationary part resulting from an expansion of the heat-expandable material and which bears the sleeve to cut/allow the flow of fluid,
a compression spring for returning the stationary part and the moving part of the thermostatic element toward one another, and
a bracket for supporting the compression spring, which, during use, supports a decompression thrust produced by the compression spring and which is provided with:
fasteners for fastening to a bearing portion of the housing that is transverse to the axis, said fasteners cooperating in a form-fitting manner with the bearing portion so as to be attached with the bearing portion along the axis resulting from a decompression thrust produced by the spring, and
locking features that axially abut against the bearing portion of the housing so as to keep the fasteners attached to the bearing portion when a stress compressing the compression spring is applied on the bracket.

BRIEF DESCRIPTION OF THE DRAWINGS

The invention will be better understood upon reading the following description, provided solely as an example and done in reference to the drawings, in which.

DETAILED DESCRIPTION

Valves with sleeves integrate a compressed spring that is powerful enough both to return the sleeve to the position it occupied before it was driven by a moving part of the thermostatic element, and to return that moving part toward a stationary part of the thermostatic element, fixedly connected to the valve housing. The opposite ends of this compressed spring can be arranged respectively bearing against a dedicated part of the valve housing and against a force resisting part, movably connected to the sleeve, as for example proposed in U.S. Pat. No. 4,022,377. FR 2,993,036 and WO2013/124410 propose that the decompression thrust produced by the spring be supported by a rigid bracket, typically made from metal, that, during use, is fixedly connected to the housing: in fine, the housing therefore resists the opposite forces necessary to fix the position of the bracket and necessary to fix the position of the thermostatic element, respectively. Inasmuch as, in particular for economic and practical reasons, it is greatly desired to make the valve housing from a plastic material, WO 2013/124410 provides for having the bracket, for fastening thereof to the housing, and the fixed part of the thermostatic element, also for fastening to the housing, with a same bearing portion of the housing, which is transverse to the axis of the sleeve, and which, in WO 2013/124410, consists of the central region of a transverse bridge of the valve housing: in this way, the mechanical stresses generated during use by the thermostatic element and by the compressed spring are essentially applied to the bearing portion of the housing, which, even made from plastic, absorbs them without damage due to the compressive nature of these stresses. In practice, WO 2013/124410 provides that, at one of its ends, the bracket cooperates in a form-fitting manner with the bearing portion of the housing so as to be attached to this bearing portion along the axis of the sleeve under the effect of the decompression thrust produced by the spring: as long as the spring is assembled to the other components of the valve in a fairly compressed state, this arrangement is both sufficient to ensure, during use, the fixed connection between the bracket and the housing, and convenient to facilitate the assembly of the valve, with the understanding that it is then not necessary to permanently fixedly secure the bracket to the bearing portion of the housing. However, this arrangement may lead to a malfunction of the valve when, in case of impact or incorrect manipulations, in particular during the installation or maintenance of the valve, a fairly substantial stress is applied on the bracket and leads to compressing the spring: the risk is that the bracket will partially or completely detach from the bearing portion of the housing.

The aim of the present invention is to improve the valves with sleeves and brackets of the type mentioned above, by securing the attachment of their bracket, while reconciling good mechanical strength during use and great ease of assembly.

One of the ideas at the base of the invention is not to try to strengthen or stiffen the attachment link between the bracket and the bearing portion of the housing, but to incorporate locking features into the bracket in position on this bearing portion, which are separate from the fasteners providing the attachment link: when a stress is applied on the bracket that over-compresses the spring and therefore risks detaching the bracket, typically in case of impact or axial bearing on the end of the bracket opposite the bearing portion of the housing, these locking features keep the bracket in place and therefore prevent it from detaching, axially abutting against the bearing portion of the housing. The mechanical strength of the valve is not altered, since the mechanical stresses generated by these locking features when they abut against the bearing portion consist of a compression stress of this bearing portion and can therefore be absorbed without damaging the plastic material making up this bearing portion if the housing is made from plastic. Furthermore, the assembly of the valve according to the invention is advantageously not complicated by the presence of these locking features: on the contrary, through clever arrangements described later, these locking features interfere with the rest of the valve to reach the usage configuration while the bracket is attached to the bearing portion of the housing. In all cases, the invention makes it possible not to lose the practical benefit of assembling the bracket to the housing by simple attachment, regarding both the sizing of the affected parts of the valve and the assembly operations of this valve.

According to additional features of the thermostatic valve according to the invention:

The bearing portion of the housing is at least partially arranged so as to be axially interposed between the fasteners and the locking features.

The bearing portion of the housing includes an annular rim, which is centered on the axis and against the axially opposite faces of which the fasteners bear resulting from a decompression thrust produced by the compression spring and the locking features bear when a stress compressing the compression spring is applied on the bracket, respectively.

The bracket includes arms, which are distributed around the axis and each have two ends, opposite one another in the longitudinal direction of the arm and connected to one another by a running part of the arm, the fasteners are provided at a first of the two ends of the arms, the locking features are provided in the running part of the arms, and the second end of the arms is designed so as, during use, to cooperate with an end of the compression spring in order to resist a decompression thrust produced by the compression spring.

The second end of the arms is designed to cooperate, in a form-fitting manner, with said end of the spring.

The first end of each arm is free with respect to the rest of the bracket, while the respective second ends of the arms are secured together by a crown of the bracket, and, at the second end, each arm is connected to the crown so as to be deformable between:
 a usage configuration, in which the fasteners are arranged axially overhanging the bearing portion of the housing so as to be attached to the bearing portion resulting from a decompression thrust produced by the compression spring, and in which the locking features are arranged axially overhanging the bearing portion of the housing so as to axially abut against the bearing portion when a stress compressing the compression spring is applied on the bracket, and
 a first assembly configuration, in which the fasteners and the locking features are separated, by moving away from the axis, from the respective places that they occupy when the arm is in the usage configuration, so as not to interfere with the bearing portion of the housing,
by going through a second assembly configuration, which is midway between the usage configuration and the first assembly configuration, and in which the fasteners are arranged axially overhanging the bearing portion of the housing so as to be attached to the bearing portion resulting from a decompression thrust produced by the compression spring, while the locking features interfere with the bearing portion of the housing in a direction transverse to the axis to offset them, by moving away from the axis, from the place that they occupy when the arm is in the usage position.

The locking features include at least one tongue, which is supported by the running part of the arms so as to be elastically deformable, relative to the rest of the running part of the arms, between a rest position, in which the tongue is deployed toward the axis relative to the rest of the running part of the arms and which is occupied by the tongue when the arms of the bracket are in the usage configuration, and a deformed position, in which the tongue is at least partially retracted with respect to the rest of the running part of the arms and which is occupied by the tongue when the bracket is in the second assembly configuration.

The fasteners include at least one hook, which is supported by the first end of the arms and which has a recess suitable for receiving an annular rim, substantially centered on the axis, of the bearing portion of the housing.

Each arm is movable between the usage position and the first and second assembly configurations by tilting around an axis substantially orthoradial to the axis.

In the usage configuration, the arms extend substantially parallel to the axis.

The bearing portion of the housing also cooperates with the stationary part of the thermostatic element to connect the stationary part fixedly to the housing.

The bearing portion of the housing cooperates in a form-fitting manner with the stationary part of the thermostatic element.

The housing is made from plastic.

FIGS. 1 to 5 show a valve 1 suitable for controlling the circulation of a fluid. The valve 1 is for example used in a cooling circuit of a heat engine of a vehicle.

The valve 1 includes a housing 10 in which the aforementioned fluid circulates. This housing 10 is in particular made from a plastic, for example by molding. In the embodiment considered here, the housing 10 comprises, as clearly shown in FIGS. 1 and 2, a main body 11 that includes a closing wall 12 separating an inner side and an outer side of the main body 11, the fluid regulated by the valve flowing, except in abnormal leakage cases, exclusively on the inner side of this closing wall 12. As clearly shown in FIG. 1, the closing wall 12 extends transversely to a geometric axis X-X, which belong to the cutting plane of FIG. 1 and relative to which the rest of the description is oriented for convenience, considering that this axis X-X extends along the vertical, the inner side of the main body 11 being the side of the closing wall 12, turned upward in FIGS. 1 to 5.

In its central region, through which the axis X-X passes, the closing wall 12 includes a bearing portion 13 within the mechanical meaning of the term: in other words, the bearing portion 13 constitutes part of the closing wall 12, serving as a support for other pieces of the valve. This bearing portion 13 extends, at least in part, transversely to the axis X-X so as to serve as an axial support for other pieces of the valve 1, as gradually explained hereinafter. In the example embodiment considered here, the bearing portion 13 has a tubular global shape, substantially centered on the axis X-X: more specifically, the bearing portion 13 comprises a tubular wall 14, centered on the axis X-X and extending axially on either side of the rest of the closing wall 12, as well as, on the one hand, in the lower part of this tubular wall 14, a bottom wall 15, which closes the inner volume of the tubular wall 14, while extending globally in a geometric plane perpendicular to the axis X-X, and, on the other hand, in the upper part of the tubular wall, an annular rim 16, which, as clearly shown in FIGS. 1 and 2, outwardly surrounds the tubular wall 14 while extending globally in a geometric plane perpendicular to the axis X-X.

During use, the aforementioned fluid flows on the inner side of the closing wall 12, while being regulated by a closing sleeve 20, which, by definition, has a tubular global shape, centered on the axis X-X, and the cylindrical main body of which has a solid wall over its entire periphery. For visibility reasons, the sleeve 20 is not shown in FIG. 2. The sleeve 20 is translatable along the axis X-X relative to the closing wall 12: when this sleeve is sealably pressed, by its lower axial end 21, against a seat 17, such as a sealing gasket, secured to the main body 11, as in the configuration shown in FIG. 1, the circulation of the fluid, radially to the axis X-X, is interrupted between the inside and the outside of the sleeve 20 at its end 21, whereas, when the sleeve 20 is separated from the seat 17, the fluid can circulate freely between the inside and the outside of the sleeve radially to the axis X-X at its end 21. In practice, the circulation direction of the fluid at the end 21 of the sleeve 20 is not limiting with respect to the invention. Likewise, the specificities of the regulation of the fluid at the upper axial end 22 of the sleeve 20 are not limiting, having noted that, in the example embodiment considered in the figures, the fluid circulates freely between the inside and the outside of the sleeve parallel to the axis X-X at this end 22. Moreover, in a manner not shown in the figures, the housing 10 of the valve 1 can include additional walls or parts, integral with its main body 11 or separate from the latter, but fixedly attached to this main body, to channel, outside the sleeve 20, the flows of fluid at one and/or the other of its ends 21 and 22.

Figure 2:
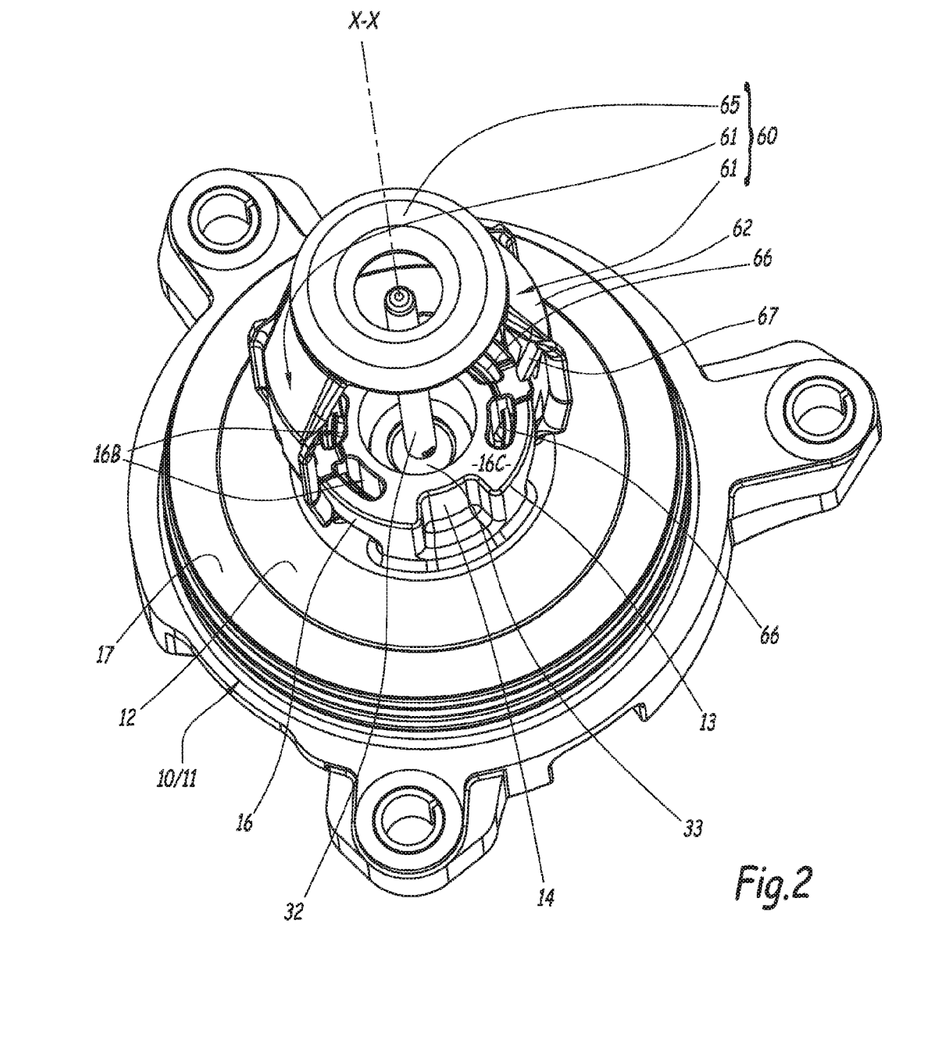
FIG. 2 is a perspective view of the valve of FIG. 1, certain components of which are not shown so as to better see the remaining components.

To command the movement of the sleeve 20, the valve 1 comprises a thermostatic element 30. In a known manner, the thermostatic element 30 comprises an upper cup 31, which is substantially centered on the axis X-X and which contains a heat-expandable material, not shown in the figures, such as wax. The thermostatic element 30 also comprises a lower piston 32, which is centered on the axis X-X and which is movable relative to the cup 31 in a translational movement substantially along the axis X-X. In FIG. 2, for visibility reasons, the piston 32 is shown, but the cup 31 is not shown. The piston 32 is thus movable resulting from the expansion of the heat-expandable material contained in the cup 31, the piston being deployed outside the cup when that material is heated. When the heat-expandable material cools, the piston 32 retracts inside the cup 31 resulting from the decompression thrust from a compressed spring 40. For visibility reasons, this spring 40 is not shown in FIG. 2.

Advantageously, in one preferred embodiment, a heating electrical resistance, not shown in the figures, is arranged inside the piston 32, then made in the form of a heat conducting tube, such that when that resistance is supplied with electricity, it can heat the heat-expandable material contained in the cup 31. This electrical heating of the heat-expandable material completes the heating coming from the cup 31, which is also made from a heat-conducting material, this cup in fact being heated by the fluid in which it is bathed. In practice, depending on the case, these two heat sources participate in similar proportions or, on the contrary, one is negligible relative to the other, without this being limiting on the present invention. Furthermore, as one alternative that is not shown, the aforementioned electrical resistance may be missing, the cup 31 then only being thermally stressed by the fluid in which it is bathed.

Returning to the description of the embodiment considered in the figures, it will be noted that the lower end of the piston 32, i.e., its end emerging from the cup 31, is secured to a base 33 that cooperates with the housing 10 for the purpose of fastening the piston 32 to that housing. In practice, and as indicated diagrammatically in FIG. 1, various forms of securing between the piston 32 and the base 33 can be considered: for example, the base can be forcibly fitted inside the lower terminal part of the piston 32 or can be overmolded and/or glued to said terminal part.

The base 33 is received in a complementary manner in the free inner volume of the tubular wall 14 of the bearing portion 13, bearing axially downward against the bottom wall 15. Thus, the mechanical connection between the main body 11 of the housing 10 and the piston 32 of the thermostatic element 30, more specifically between the bearing portion 13 of the closing wall 12 and the base 33 secured to this piston, is produced at least by the fixed axial downward bearing of the base 33 against the bottom wall 16 of the bearing portion 13, this base 33 also advantageously being immobilized transversely to the axis X-X inside the tubular wall 14 of the bearing portion 13, by shape adjustment. The fixed bearing of the piston 32 against the bearing portion 13 may not be upwardly blocked by the cooperation between this bearing portion and the piston or its base 33. Alternatively, for example by providing a slightly forced mounting, it is possible to retain the piston 32 axially upward relative to the bearing portion 13.

Figure 1:
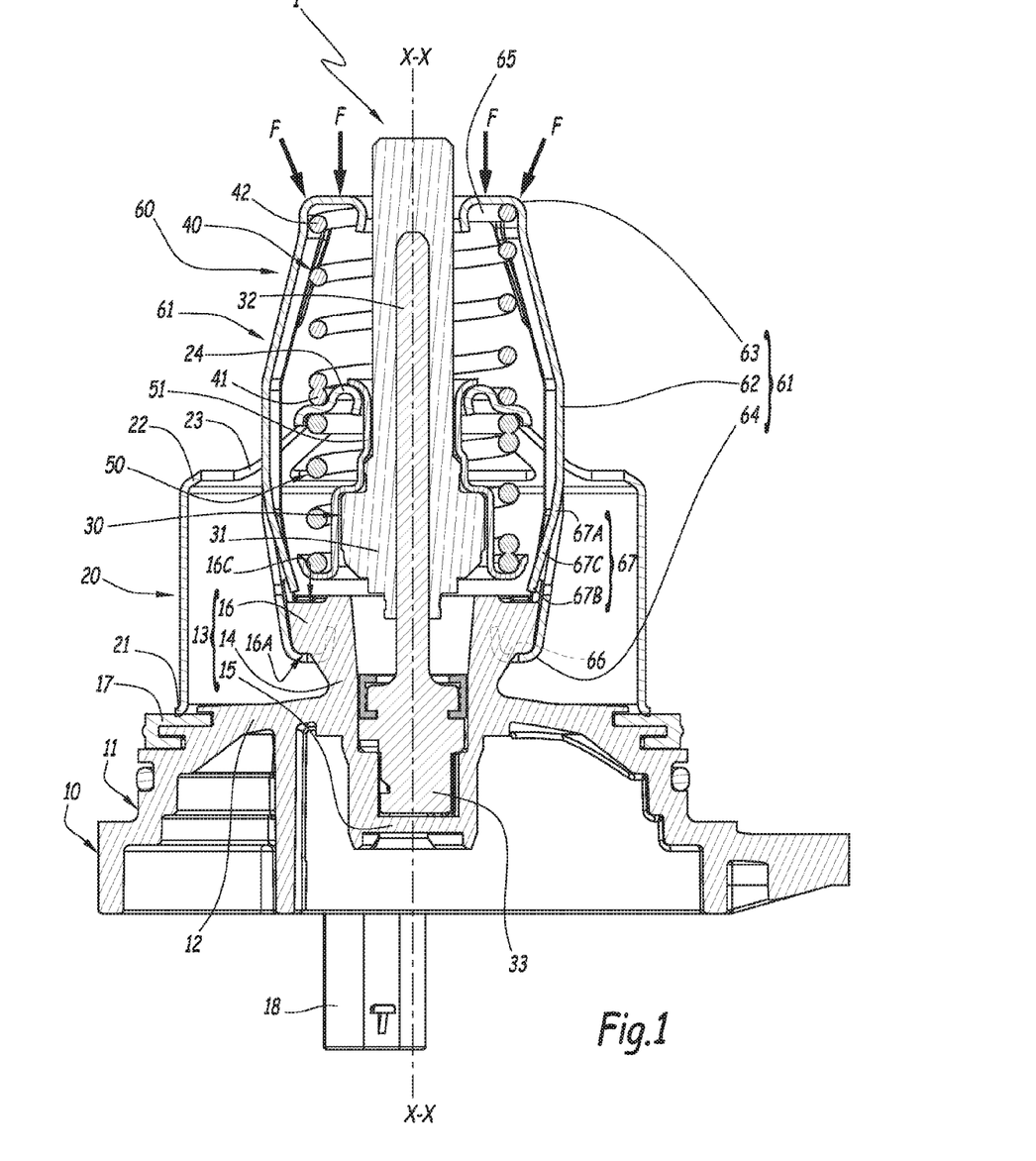
FIG. 1 is a longitudinal cross-section of a thermostatic valve according to the invention, shown in a usage configuration.

In the context of the preferred embodiment mentioned above, the base 33 also provides the electrical connection between the electrical resistance, contained inside the piston 32, and electrical conductors, not shown in the figures, which are supported by the housing 10 and which extend from the inner volume of the tubular wall 14 of the bearing portion 13, where they are electrically connected to the base 33, to the outside of at least the closing wall 12, or more generally, to the outside of the housing 10, where these conductors can then be connected, for example at a jack 18 of the housing visible in FIG. 1, to an outside wiring harness, not shown, connected to a current source. It will be understood that these electrical conductors make it possible to power the electrical resistance contained inside the piston 32 from the aforementioned electricity source, subject to the electrical connection between the terminals of that resistance and the aforementioned electrical conductors, via inner arrangement elements of the base 33, not shown in figures. As an example, the aforementioned electrical conductors are attached or integrated by overmolding to the plastic making up the closing wall 12, including its bearing portion 13.

Returning to the description of the embodiment considered in figures, it will be understood that, in use, the relative movements between the cup 31 and the piston 32 of the thermostatic element 30 consist of movements of that cup relative to the housing 10 fixedly connected to the piston 32. Consequently, to control the movement of the sleeve 20 along the axis X-X, that sleeve is cinematically connected to the cup 31. A first possible approach, not illustrated by the embodiment considered in the figures, consists of providing a fixed mechanical link between the sleeve 20 and the cup 31.

One alternative, considered here, provides for inserting an overtravel spring 50 between them that has a stiffness strictly greater than that of the compression spring 40 and that is only stressed when, once the sleeve 20 has been axially separated from the seat 17 under the driving action of the cup 31, any additional upward driving of the sleeve is made impossible, typically due to the upward axial abutment of this sleeve against a stationary obstacle or because the maximum compression of the spring 40 has been reached. Thus, in more detail in the example embodiment considered in the figures, the sleeve 20 is provided with arms 23 that extend rigidly, from its upper end 22, toward the axis X-X. At their free end, these arms 23 are fixedly connected to one another by an annular crown 24, belonging to the sleeve and substantially centered on the axis X-X. The upper end turn of the overtravel spring 50 is axially pressed upward against the lower face of that crown 24, while the lower end turn of the overtravel spring 50 is pressed axially downward against an outer peripheral rim of a jacket 51, which outwardly surrounds the cup 31, while being fixedly connected to that cup, for example by forcible fitting, and around which the crown 24 is mounted freely sliding along the axis X-X, with a limitation of that sliding in the upward direction by the axial upward abutment of the crown 24 against an outer peripheral rim of the sleeve 51. For visibility reasons, the overtravel spring 50 and the sleeve 51 are not shown in FIG. 2. Of course, it is understood that the preceding detailed description, related to the overtravel system including the spring 50 and the jacket 51, is only an illustrative example, non-limiting with respect to the present invention, inasmuch as other overtravel assemblies that are functionally similar but structurally different can be considered.

In light of the preceding, it will be understood that, when the cup 31 of the thermostatic element 30 is translated upward along the axis X-X relative to the piston 32 under the effect of the expansion of the heat-expandable material, this upward translational movement is transmitted to the crown 24 and, subsequently, to the entire sleeve 20 by the overtravel spring 50, which, when the sleeve is not prevented from following this translational movement, remains in a substantially unchanged state of compression. In order to drive the sleeve 20 in a reverse translational movement when the heat-expandable material contracts, the lower end turn 41 of the compressed spring 40 bears axially downward against the upper face of the crown 24 of the sleeve 20 such that, under the action of a decompression thrust of the spring 40, the latter is able to return the sleeve 20 toward the seat 17 and the cup 31 toward the piston 32 simultaneously. The compression of the spring 40 during the separation of the sleeve 20 relative to the seat 17, then the release of the decompression thrust to return that sleeve, are based on the fact that the upper end turn 42 of the spring 40 is axially upwardly retained relative to the housing 10, by means of a force resisting bracket 60.

The bracket 60 is made from metal or, more generally, from a material capable of withstanding the working stresses produced by the spring 40 without undergoing significant deformation. This bracket 60 comprises distinct arms 61, which are distributed substantially regularly around the axis X-X and of which there are two in the example embodiment considered here, while being individually identical to one another.

Each arm 61 includes an elongated running part 62, which connects an upper end 63 and a lower end 64 of the arm 61 to one another and which, when the bracket 60 is in use, i.e., it is assembled to the other components of the valve 1 in a usage configuration of the valve, as in FIG. 1, extends lengthwise substantially parallel to the axis X-X.

The spring 40 is fixedly connected to the respective upper ends 63 of the arms 61: in the example embodiment considered here, the ends 63 of the arms 61 are secured to one another by a crown 65 of the bracket, which is centered on the axis X-X and which is arranged coaxially around the cup 31 of the thermostatic element 30, with free relative sliding along this axis.

At the lower end 64 of each arm 61, the bracket 60 cooperates mechanically with the bearing portion 13 of the closing wall 12 for fastening of the bracket to the main body 11 of the housing 10. To that end, the lower end 64 of each arm 61 is provided with at least one hook 66, the recess of which is oriented upward and designed to receive a peripheral portion of the annular rim 16 of the bearing portion 13. In the example embodiment considered here, as clearly shown in FIG. 2, two such hooks 66 are provided at the lower end 64 of each arm 61, these two hooks 66 being situated at the same horizontal level, but following one another around the axis X-X. In the assembled state of the valve 1, as shown in FIG. 1, the lower face 16A of the annular rim 16 of the bearing portion 13 bears axially downward against the bottom of the recess of the hooks 66: the bracket 60 is thus, by its hooks 66, fixed to the bearing portion 13 of the closing wall 12 of the housing 10, in that the axial forces oriented upward, applied by the compressed spring 40 on the crown 65 connecting the upper end 63 of the arms 61 of the bracket 60, are absorbed and transmitted by these arms 61 to the hooks 66, which in turn absorb them and transmit them to the lower face 16A of the rim 16 of this bearing portion 13.

Advantageously, as in the example embodiment considered in the figures, the free end of each hook 66 is curved upward to engage axially in a complementary recess 16B of the rim 16, which, in addition to being downwardly open to allow this curved free end of the hook to be engaged, is also upwardly open, as shown in FIG. 2, in particular for visual inspection and/or accessibility reasons, typically for maintenance or disassembly operations of the valve, and for molding reasons. Irrespective of whether these recesses 16B are upwardly open, they allow each of the corresponding peripheral portions of the rim 16 to be wedged, in a radial direction with respect to the axis X-X, in the recess of the corresponding hooks 66, as shown in FIG. 2 and indicated in dotted lines in FIG. 1.

Furthermore, as clearly shown in FIGS. 1 and 2, the running part 62 of each arm 61 of the bracket 60 is provided with a tongue 67 that extends, from the rest of the running part 62, both downward and toward the axis X-X. Each tongue 67 thus has two opposite ends 67A and 67B along the longitudinal direction of the tongue, i.e., an upper end 67A, which connects the rest of the tongue 67 to the rest of the running part 62 and is situated in the longitudinal profile of the rest of the running part 62, and a lower end 67B, which is free and is situated radially closer to the axis X-X than the upper end 67A. The ends 67A and 67B of each tongue 67 are connected to one another by the running part 67C of the tongue, which, in the example considered here, extends substantially rectilinearly. In the usage configuration of the valve 1, as in FIG. 1, the lower end 67B of each tongue 67 is arranged axially overhanging the upper face 16C of the annular rim 16, with functional play inserted between them: in this way, when a downward stress is applied on the bracket as indicated by the arrows F in FIG. 1, or in other words when the bracket, for example in case of impact or incorrect manipulations, typically during the installation and maintenance of the valve 1, experiences a stress tending to over-compress the spring 40, one and/or the other of the respective lower ends 67B of the tongues 67 axially downwardly abut against the upper face 16C of the rim 16, thus locking the bracket 60 in position in the direction of the axis X-X relative to the rest of the valve 1. Thus, the bracket 60 is, by its tongues 67, axially kept in position by downward abutment against the bearing portion 13 of the closing wall 12, in that the downwardly oriented axial forces, applied on the bracket due to the stress F compressing the spring 40, are absorbed and transmitted by the arms 61 to the tongues 67, which in turn absorb them and transmit them to the bearing portion 13, more specifically to the upper face 16C of the rim 16 of this bearing portion 13.

Advantageously, as in the example embodiment considered in the figures, the two hooks 66 and the tongue 67 of each arm 61 of the bracket 60 follow one another along a peripheral direction around the axis X-X, the two hooks being situated on either side of the tongue, as clearly shown in FIG. 2.

During use, when the compressed spring 40 works, the stresses that it applies to the bracket 60 are absorbed by the latter and transmitted to the bearing portion 13 of the closing wall 12 of the main body 11 of the housing 10, as explained above. Additionally, still during use, when a stress overstressing the spring 40 is applied on the bracket 60, like the aforementioned stress F, the tongues 67 axially abut against this bearing portion 13 so as to keep the hooks 66 attached to the bearing portion 13, by locking the bracket 60 in position relative to the housing 10. Thus, during the use of the valve 1, the bearing portion 13, in particular its annular rim 16, experiences compression by upward axial bearing of the hooks 66 and by downward axial bearing by the tongues 67, most or practically all of the forces respectively related to the fixing of the bracket 60 to the main body 11 of the housing 10 and the blocking of this bracket in position relative to this main body 11 thus being concentrated on the axially opposite faces 16A and 16C of the rim 16 of the bearing portion 13. This essentially means that the rim 16 is axially sandwiched between the hooks 66 and the tongues 67 of the bracket 60. In practice, this rim 16 and, more generally, the bearing portion 13 of the closing wall 12 of the main body 11, bear such stresses without damage even when their values are high, since by nature, the plastic material making up the bearing portion 13 has a high level of compressive strength.

According to one advantageous aspect, which is implemented in the embodiment considered here, the bearing portion 13 of the closing wall 12 absorbs, in addition to the respective fixing stresses of the bracket 60 to the main body 11 of the housing 10 and locking in position of this bracket, the fixing stresses of the piston 32 to the main body 11, via the base 33, as explained above. Thus, during use, the thrust produced by the decompression of the spring 40, as well as the stress F applied on the bracket, are absorbed, via the bracket, as close as possible to the fixed support of the piston 32: this thereby concentrates all of the corresponding forces on the bearing portion 13 of the closing wall 12, which, as explained above, withstands them without damage, the rest of the closing wall 12 and, more generally, of the housing 10 consequently being able to be sized "as small as possible", since it is only subject to limited forces when the valve 1 is in use.

Building on the preceding considerations, it will be noted that, in practice, the spring 40 is assembled to the other components of the valve 1 in a compressed state, possibly greatly, i.e., with an axial length strictly smaller than that which this spring occupies when idle: in this way, the spring 40 continuously produces a decompression thrust along the axis X-X, which tends simultaneously to keep the hooks 66 of the bracket 60 upwardly bearing against the bearing portion 13, to keep the base 33 of the piston 32 downwardly bearing against this same bearing portion 13, and to keep the sleeve 20 bearing under a load against the seat 17 as long as the thermostatic element 30 is not heated up, which strengthens the sealing of the bearing of the sleeve against this seat.

According to one practical embodiment, the bracket 60 is made in the form of a single-piece metal part, obtained by stamping. In particular, the arms 61, the crown 65, the hooks 66 and the tongue 67 are integral with one another. Preferably, the tongues 67 are stamped relative to the rest of the running parts 62 of the arms 61, i.e., they are cut and bent relative to the rest of the running parts 62, advantageously in the same stamping tool of the bracket 60 assembly.

Figures 3, 4, 5:
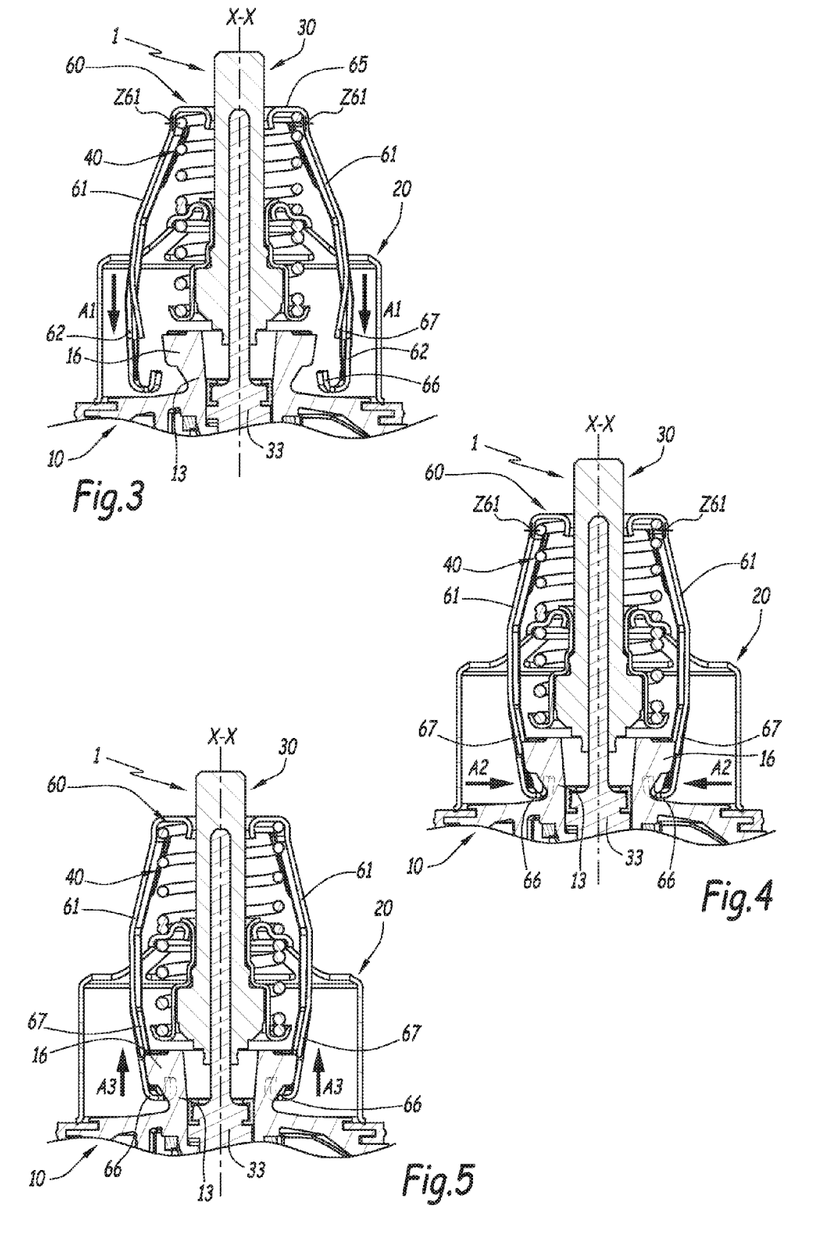
FIGS. 3 to 5 are views similar to FIG. 1, partially truncated, these figures respectively showing three successive assembly configurations of the valve.

FIGS. 3 to 5 illustrate an advantageous optional arrangement of the bracket 60, facilitating the assembly of the valve 1, i.e., at their upper part 63, the arms 61 are connected to the crown 65 so as to be deformable between the usage configuration, shown in FIG. 1, and assembly configurations, shown in FIGS. 3, 4 and 5. To go between these configurations, each arm 61 is moved relative to the crown 65 by tilting around a geometric axis Z61 extending at the corresponding upper end 63, in a direction substantially orthoradial to the axis X-X, as indicated in FIGS. 3 and 4.

Thus, in the assembly configuration shown in FIG. 3, each arm 61 is inclined relative to the axis X-X, moving downward away from this axis, such that both the radial distance between the hooks 66 of the arm and the axis X-X and the radial distance between the tongue 67 of the arm and the axis X-X are each strictly larger than the radius of the bearing portion 13 of the closing wall 12: in this assembly configuration of FIG. 3, the hooks 66 and the tongues 67 of the arms 61 are each far enough away from the axis X-X to allow the downward axial reception, without interference, between the arms 61, of the spring 40 and the rim 16 of the bearing portion 13, as well as, if applicable, the overtravel spring 50 and the sleeve 51, as well as, potentially, the cup 31 and the piston 32 of the thermostatic element 30, as illustrated by arrows A1 in FIG. 3. Once the upper end turn 42 of the spring 40 is pressed on the crown 65 of the bracket 60, the downward movement A1 is continued, so as to compress the spring 40 and arrange the hooks 66 below the axial level of the lower face 16A of the rim 16 of the bearing portion 13, as shown in FIG. 3.

While keeping the spring 40 in this compressed state, the arms 61 are then tilted inward, i.e., toward the axis X-X, around their tilting axis Z61, as indicated by arrows A2 in FIG. 4: the hooks 66 of the arms 61 are thus each brought closer to the axis X-X, until these hooks 66 are arranged axially overhanging the rim 16 of the bearing portion 13, more specifically such that the respective curved free ends of these hooks are arranged axially overhanging the recesses 16B of this rim 16. As shown in FIG. 4, the arms 61 then extend substantially parallel to the axis X-X. In so doing, during the tilting of the arms 61 resulting from the movement A2, the tongues 67 enter into mechanical interference with the rim 16 of the bearing portion 13 in a direction transverse to the axis X-X: as indicated by comparing FIGS. 3 and 4, each tongue 67 is stressed, by radial bearing oriented opposite the axis X-X, to deform relative to the rest of the running part 62 of the corresponding arm 61, from its initial relative position of FIG. 3, in which the tongue is deployed toward the axis X-X relative to the rest of the running part 62, to a deformed position, in which the tongue retracts by at least partially withdrawing into the thickness of the rest of the running part 62.

Subject next to the raising of the bracket 60 upward relative to the rest of the valve 1, as indicated by arrows A3 in FIG. 5, the spring 40 partially decompresses and the hooks 66 attach to the rim 16 of the bearing portion 13, as shown in FIG. 5, until, in fine, they press the bottom of their recess upward against the lower face 16A of the rim 16, thus reaching the usage configuration of FIG. 1. In so doing, during the raising of the arms 61 resulting from the movement A3, the interference, by radial bearing, between the tongues 67 and the rim 16 is maintained, as shown in FIG. 5, until the respective free ends of the tongues 67 pass above the axial level of the upper face 16C of the rim 16 when the usage configuration of FIG. 1 is reached: each tongue 67 can then go from its aforementioned deformed position to its aforementioned initial position, in which the free end of the tongue is arranged axially overhanging the rim 16 to abut axially against this rim in case of application of the compression force F of the spring 40. Particularly advantageously, the passage of the tongues 67 from their deformed position to their initial position is obtained by resilience of the tongues, in that their aforementioned initial position corresponds to an idle position, from which the tongues elastically depart toward the deformed position during their interference by radial bearing against the rim 16 in the assembly configurations of FIGS. 4 and 5, and which they tend to automatically regain, by elastic return, when this interference stress ceases, in the case at hand when the valve 1 reaches the usage configuration of FIG. 1 at the end of its assembly.

As an alternative to what has just been described, the use of a tool for deforming the tongues 67, once the hooks 66 are attached to the bearing portion 13, is not precluded, to accompany the elastic resilience effect of the tongues, or even to plastically deform the tongues if the developments related to this elastic resilience are not integrated into the bracket 60.

Likewise, the bracket 60 is manufactured in an initial configuration in which these arms 61 can be either in their assembly configuration of FIG. 3, or in their usage configuration of FIG. 1, or in an intermediate position between the two aforementioned configurations, with the understanding that, during the assembly of the valve 1, an ad hoc tooling makes it possible, depending on the case, to separate the hooks 66 from the arms 61 or bring them closer thereto, by tilting thereof around respective axes Z61.

Moreover, various arrangements and alternatives to the valve 1 described thus far may be considered. As examples:
embodiments other than the hooks 66 are possible as fasteners, for the bracket 60, which fasten by upward axial attachment to the bearing portion 13 of the closing wall 12 of the main body 11 of the housing 10; likewise, embodiments other than the tongues 67 are possible as locking features, for the bracket 60, for locking in position on the bearing portion 13, by downward axial bearing so as to keep the fasteners attached;

instead of the bearing portion 13, to which the bracket 60 is fixed and locked in position, belonging to a closing wall like the closing wall 12 of the main body 11 of the housing 10, this bearing portion may consist of the central region of a bridge that extends through a tubular wall of the housing and that is fixedly connected to this tubular wall, typically by being integral with this tubular wall when the housing is made from plastic; in this case, it will be understood that, at the axial level of this bearing portion, fluid circulation is possible downward and/or upward, by conveying on either side of the aforementioned bridge; one example of such a transverse bridge is given in WO 2013/0124410, to which the reader may refer for further details; and/or as an alternative to the preferred embodiment described above, in which a heating resistance is placed in the piston 32 of the thermostatic element 3, such a resistance may be placed inside a tube, which is separate from the piston of the thermostatic element and which, in general, extends through the bottom of the cup of the thermostatic element, opposite the piston of this element, in order to heat the thermodilatable material, the cup then being stationary relative to the housing 10 while the piston bears the sleeve to control the corresponding opening and closing of the valve.

The invention claimed is:

1. A thermostatic valve, including:
a housing in which a fluid circulates,
a sleeve for regulating the circulation of the fluid in the housing, this sleeve being substantially centered on an axis along which the sleeve is movable relative to the housing to cut or allow a flow of fluid,
a thermostatic element, containing a heat-expandable material and comprising a stationary part, which is fixedly connected to the housing, and a moving part, which is movable along the axis relative to the stationary part resulting from an expansion of the heat-expandable material and which bears the sleeve to cut or allow the flow of fluid,
a compression spring for returning the stationary part and the moving part of the thermostatic element toward one another, and
a bracket for supporting the compression spring, which, during use, supports a decompression thrust produced by the compression spring and which is provided with:
fasteners for fastening to a bearing portion of the housing that is transverse to the axis, said fasteners cooperating in a form-fitting manner with the bearing portion so as to be attached with the bearing portion along the axis as a result of a decompression thrust produced by the spring, and
locking features that axially abut against the bearing portion of the housing so as to keep the fasteners attached to the bearing portion when a stress compressing the compression spring is applied on the bracket.

2. The thermostatic valve according to claim 1, wherein the bearing portion of the housing is at least partially arranged so as to be axially interposed between the fasteners and the locking features.

3. The thermostatic valve according to claim 1, wherein the bearing portion of the housing includes an annular rim, which is centered on the axis and against axially opposite faces of which the fasteners bear as a result of the decompression thrust produced by the compression spring and the locking features bear when a stress compressing the compression spring is applied on the bracket, respectively.

4. The thermostatic valve according to claim 1, wherein the bracket includes arms, which are distributed around the axis and each have two ends, opposite one another in the longitudinal direction of the arm and connected to one another by a running part of the arm,
wherein the fasteners are provided at a first of the two ends of the arms,
wherein the locking features are provided in the running part of the arms, and
wherein the second end of the arms is designed so as, during use, to cooperate with an end of the compression spring in order to resist a decompression thrust produced by the compression spring.

5. The thermostatic valve according to claim 4, wherein the second end of the arms is designed to cooperate, in a form-fitting manner, with said end of the spring.

6. The valve according to claim 4, wherein the first end of each arm is free with respect to the rest of the bracket, while the respective second ends of the arms are secured together by a crown of the bracket, and wherein, at the second end, each arm is connected to the crown so as to be deformable between:
a usage configuration, in which the fasteners are arranged axially overhanging the bearing portion of the housing so as to be attached to the bearing portion as a result of the decompression thrust produced by the compression spring, and in which the locking features are arranged axially overhanging the bearing portion of the housing so as to axially abut against the bearing portion when a stress compressing the compression spring is applied on the bracket, and
a first assembly configuration, in which the fasteners and the locking features are separated, by moving away from the axis, from the respective places that they occupy when the arm is in the usage configuration, so as not to interfere with the bearing portion of the housing, by going through a second assembly configuration, which is midway between the usage configuration and the first assembly configuration, and in which the fasteners are arranged axially overhanging the bearing portion of the housing so as to be attached to the bearing portion as a result of the decompression thrust produced by the compression spring, while the locking features interfere with the bearing portion of the housing in a direction transverse to the axis to offset them, by moving away from the axis, from the place that they occupy when the arm is in the usage position.

7. The thermostatic valve according to claim 6, wherein the locking means include at least one tongue, which is supported by the running part of the arms so as to be elastically deformable, relative to the rest of the running part of the arms, between a rest position, in which the tongue is deployed toward the axis relative to the rest of the running part of the arms and which is occupied by the tongue when the arms of the bracket are in the usage configuration, and a deformed position, in which the tongue is at least partially retracted with respect to the rest of the running part of the arms and which is occupied by the tongue when the bracket is in the second assembly configuration.

8. The thermostatic valve according to claim 6, wherein the fasteners include at least one hook, which is supported by the first end of the arms and which has a recess suitable for receiving an annular rim, substantially centered on the axis, of the bearing portion of the housing.

9. The thermostatic valve according to claim 6, wherein each arm is movable between the usage position and the first and second assembly configurations by tilting around an axis substantially orthoradial to the axis.

10. The thermostatic valve according to claim 6, wherein, in the usage configuration, the arm extend substantially parallel to the axis.

11. The thermostatic valve according to claim 1, characterized in that the bearing portion of the housing also cooperates with the stationary part of the thermostatic element to connect the stationary part fixedly to the housing.

12. The thermostatic valve according to claim 11, wherein the bearing portion of the housing cooperates in a form-fitting manner with the stationary part of the thermostatic element.

13. The thermostatic valve according to claim 1, wherein in that the housing is made from plastic.

* * * * *